United States Patent [19]

Carlsson et al.

[11] 4,231,875
[45] Nov. 4, 1980

[54] DIFFUSION APPARATUS UTILIZING TUBULAR SEMI-PERMEABLE MEMBRANE

[75] Inventors: Per-Olov A. V. Carlsson, Sösdala; Kaj O. Stenberg, Staffanstorp, both of Sweden

[73] Assignee: Gambro AB, Sweden

[21] Appl. No.: 902,353

[22] Filed: May 3, 1978

[30] Foreign Application Priority Data

May 13, 1977 [SE] Sweden ............................... 7705656

[51] Int. Cl.³ ............................................. B01D 31/00
[52] U.S. Cl. ................................ 210/232; 210/321 B;
210/494 M
[58] Field of Search ................. 210/22, 321 A, 321 B, 210/321 R, 232, 494 M; 55/158; 422/48

[56] References Cited

U.S. PATENT DOCUMENTS

| | | | |
|---|---|---|---|
| 3,712,475 | 1/1973 | Martinez | 210/494 M X |
| 3,852,198 | 12/1974 | Murakami | 210/321 B |
| 4,006,088 | 2/1977 | Salkin | 210/321 B |
| 4,008,157 | 2/1977 | Miller et al. | 210/321 B |
| 4,009,107 | 2/1977 | Miller et al. | 210/321 B |
| 4,009,108 | 2/1977 | Miller et al. | 210/321 B |
| 4,028,253 | 6/1977 | Miller et al. | 210/321 B |
| 4,035,305 | 7/1977 | Miller et al. | 210/494 M X |
| 4,059,530 | 11/1977 | Luppi | 210/321 B |

*Primary Examiner*—Frank A. Spear, Jr.
*Attorney, Agent, or Firm*—Lerner, David, Littenberg & Samuel

[57] ABSTRACT

A diffusion apparatus is disclosed including an outer casing and an inner core within the outer casing providing an annular space therebetween so that a tubular semi-permeable membrane having a first end and a second end and spacing material can be helically wound around the inner core within the annular space. The apparatus includes first fluid directing means communicating with a first fluid within the interior of the tubular semi-permeable membrane at a first end thereof, second fluid directing means communicating with a second fluid within the annular space for contacting the outer surface of the tubular semi-permeable membrane with the second fluid, wherein the first fluid directing means includes channel means integral with the inner core, and third fluid directing means communicating with the first fluid within the interior of the tubular semi-permeable membrane at the second end thereof.

26 Claims, 14 Drawing Figures

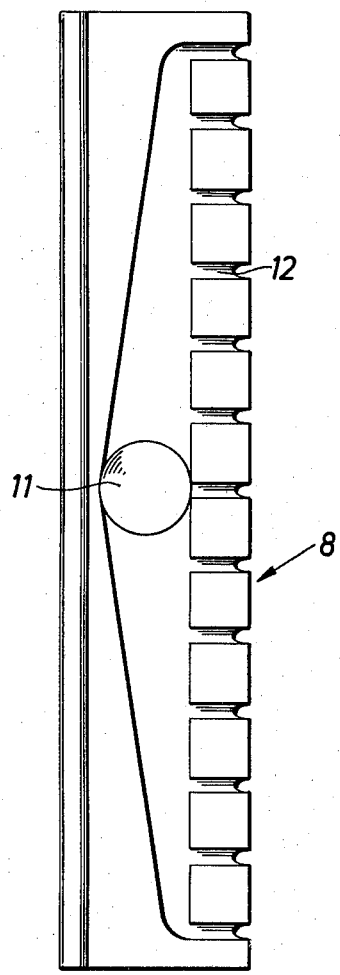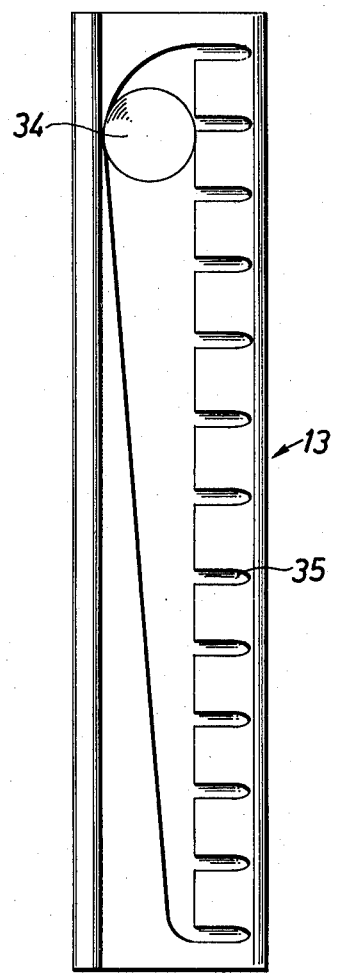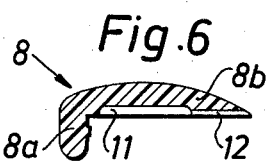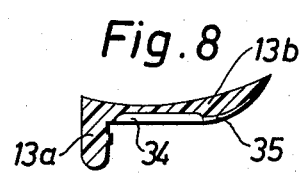

Fig. 9
Fig. 11
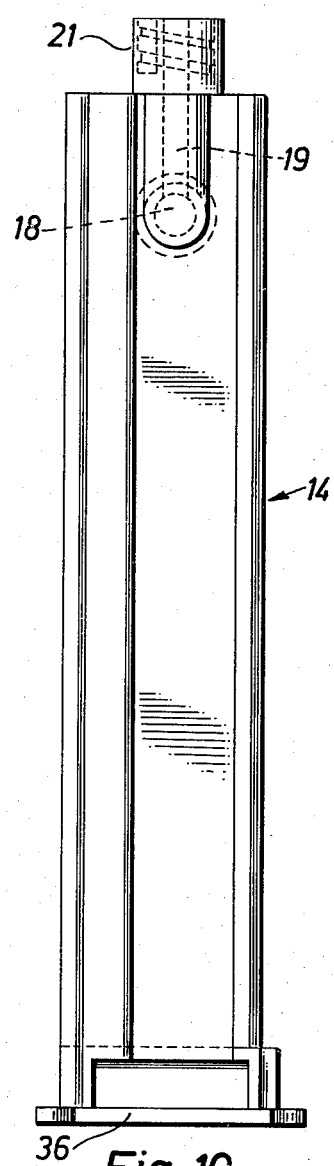
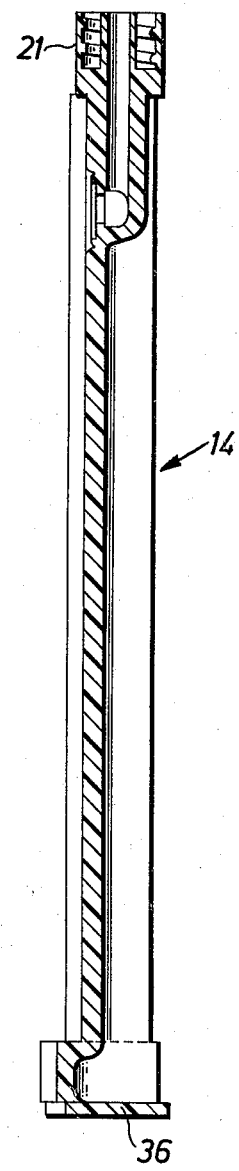
Fig. 10
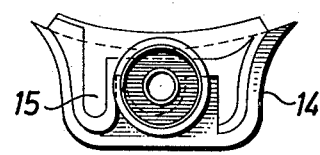

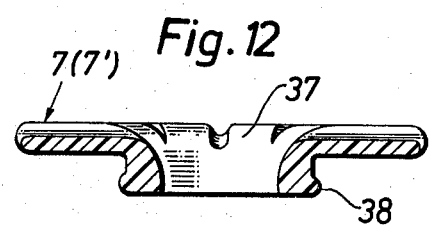
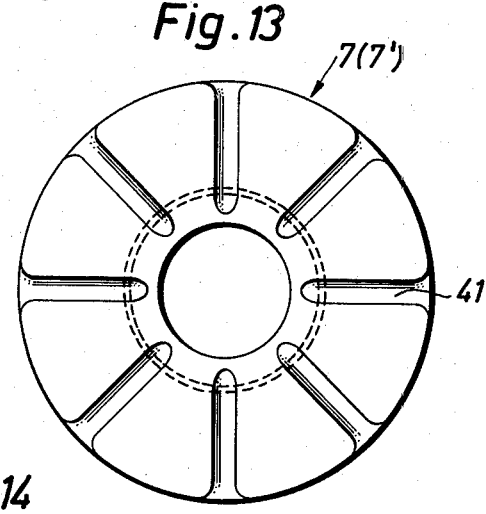
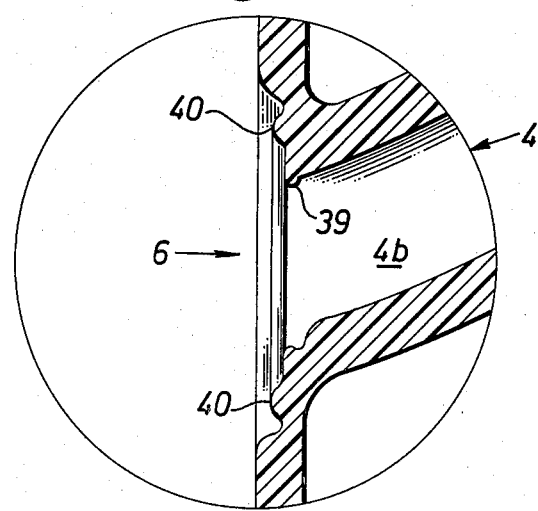

DIFFUSION APPARATUS UTILIZING TUBULAR SEMI-PERMEABLE MEMBRANE

FIELD OF THE INVENTION

The present invention relates to a diffusion device. More particularly, the present invention relates to a dialysis device including an inner core and an outer casing with a spirally wound flattened tubing of semi-permeable membrane therebetween. Still more particularly the present invention is directed to such a dialysis device in which the individual turns of the tubular semi-permeable membrane are separated by spacing material which is in the form of a network or sheet-like material, and which apparatus includes means for conducting a first liquid such as a dialysis liquid across the tubular membrane and means for conducting a second liquid such as the liquid to be dialyzed through the tubular membrane itself.

BACKGROUND OF THE INVENTION

A number of devices of the general type described above, including a spirally or helically wound flattened tube of semi-permeable membrane are known. While each of these patents teaches the use of such tubular semi-permeable membranes helically wound around a core and including various types of spacer material separating the individual turns of the tubular membrane themselves, one of the elements of each of these devices is means for delivering the fluid to be treated, such as blood, to the inside of the tubular membrane and for removing the thus treated fluid therefrom. In U.S. Pat. No. Re 27,510 such a device is taught which includes the ends of the tubular membrane being folded around a highly elastic terminal tube 9 and pulled together under strong friction so as to be leak-proof. The patentee thus employs a conical bore 8 of a confining rim 10 as best shown in FIG. 4 thereof in the outer casing 13. Similarly, in U.S. Pat. No. 3,709,367 another such device is taught which in this case includes connector units 18 and 22 for connecting the tubular membrane to tubes 20 and 24. Similar teachings are contained in U.S. Pat. Nos. 3,712,474 and 3,743,098.

Yet another such device is disclosed in U.S. Pat. No. 3,880,760, which in this case includes a core cover section 2 adapted to mate with a core base section 1 with the ends of the tubular membranes therebetween. A similar structure is employed at the other end of the tubular membrane, as shown in FIG. 2 thereof. In a similar vein is U.S. Pat. No. 3,962,095 which discloses blood inlet and outlet means 26 for connection with arterial and venous lines attached to the casing using wedge section cover plates 28 which are screwed to the casing and which form a seat for the blood inlets and outlets. Finally, U.S. Pat. No. 3,963,621 discloses yet another such membrane device, in this case merely stating that tube 18 communicates conventionally with the end 20 of the membrane 16.

In a similar type of device shown in British Pat. No. 1,417,446 the patentee again merely discloses that the core 1 includes an opening in which a sleeve 31 fits in order that the blood tube 12 can be connected to the membrane tube 2. Another substantially similar device is shown in British Pat. No. 1,433,512. Finally, German Pat. No. 2,514,580 shows yet another means for connecting a tube to the tubular membrane.

While some of these known constructions operate in a relatively satisfactory manner, each is still subject to certain disadvantages. Among other things, these constructions now on the market contain a large number of parts rendering assembly more difficult and producing a number of sealing problems. It is therefore an object of the present invention to provide a simple construction for the aforementioned type of diffusion device which includes a smaller number of parts which can be easily assembled and to therefore eliminate a number of the sealing problems previously presented.

SUMMARY OF THE INVENTION

In accordance with the present invention such a diffusion device has now been prepared including an outer casing, an inner core disposed within the outer casing defining a diffusion space between the inner core and the outer casing so that a tubular semi-permeable membrane having a first end and a second end and spacing material can be wound about the inner core within the diffusion space, first fluid directing means communicating with a first fluid within the interior of the tubular semi-permeable membrane at its first end, second fluid directing means communicating with a second fluid within the diffusion space for contacting with the outer surface of the tubular semi-permeable membrane, the first fluid directing means comprising channel means integral with the inner core, and third fluid directing means communicating with the first fluid within the interior of the tubular semi-permeable membrane at its second end.

The third fluid directing means may comprise second fluid channel means integral with the outer casing or, more preferably, comprise a clamping rail located in proximity to the outer casing and including second fluid channel means integral therewith.

In a preferred embodiment the first fluid channel means includes a substantially linear first channel portion and an arcuate second channel portion, so that one end of the first fluid channel mean is disposed axially at a point within the inner core and the opposite end of the channel means is disposed radially at a point on the surface of the inner core. Most preferably the axially disposed end of the channel means is located centrally on a transverse end wall of the inner core. The second fluid channel means will also preferably have a similar construction, including one end disposed axially at a point in the inner core and the other end disposed radially at a point on the surface of the inner core.

In a preferred embodiment both of the axially disposed ends of the channel means for the first and second fluids will include connecting means integral with the respective ends of the channel means for attachment to a fluid conducting conduit.

In another embodiment of the present invention disc means are provided cooperating with the radially disposed end of the first and second fluid channel means for sealing one face of the tubular semi-permeable membrane between the end of the channel means and the disc means so that fluid may sealingly pass from the channel means into the interior of the tubular semi-permeable membrane. Preferably the disc means will include a plurality of disc channel means for directing the first and second fluids within the tubular semi-permeable membrane.

In a preferred embodiment of the present invention pressure means are provided for forming a seal between the sides of the tubular semi-permeable membrane at both the first and second ends thereof. The pressure means will preferably include a pressure rail adapted to cooperate with the inner core.

In a preferred embodiment an inner core pressure means forms a seal between the ends of the first end of the tubular semi-permeable membrane with the disc means between the inner core pressure means and the inner core itself, and preferably the inner core pressure means will be at least as long as the width of the tubular semi-permeable membrane when flattened. Similarly, clamping rail pressure means can be provided to form a seal between the sides of the tubular semi-permeable membrane at its second end, again with the disc means between the clamping rail pressure means and the clamping rail, and also with the clamping rail pressure means having a length at least as long as the width of the tubular semi-permeable membrane when flattened.

In another embodiment of the present invention the inner core includes groove means and the inner core pressure means includes an affixing portion adapted to cooperate with the inner core groove means to affix the inner core pressure means to the inner core with the tubular semi-permeable membrane therebetween. In a similar embodiment, the clamping rail includes groove means and the clamping rail pressure means includes an affixing portion adapted to cooperate with the clamping rail groove means to affix the clamping rail pressure means to the clamping rail with the tubular semi-permeable membrane therebetween.

In a preferred embodiment of the present invention the inner core pressure means includes flow channel means on the face of the inner core pressure means facing the inner core, the flow channels adapted to receive a portion of one face of the tubular semi-permeable membrane so that channels for the first fluid are formed within the tubular semi-permeable membrane, and also wherein the inner core pressure means includes a recessed portion on its face facing the inner core at the location of the disc means to accommodate same.

In a similar embodiment of the present invention the clamping rail pressure means includes flow channel means on the face of the clamping rail pressure means facing the clamping rail, and again includes a recessed portion on that face of the clamping rail pressure means to accommodate the disc means.

In another embodiment of the present invention the inner core includes spacing material groove means adapted to cooperate with the inner core pressure means in order to retain the end of the spacing material therein. In a corresponding embodiment, spacing material groove means are provided associated with the clamping rail and adapted to cooperate with the clamping rail in order to retain the end of the spacing material therein. Preferably this will comprise a channel between the clamping rail and the outer casing.

In another embodiment of the present invention the second fluid feed means will be integral with the inner core. Preferably it will comprise an inlet nozzle and a plurality of spacer elements for directing the second fluid from the inlet nozzle to the annular space between the inner core and the outer casing. In another embodiment the inner core will include a transverse end wall and the inlet nozzle will extend axially from that transverse end wall.

In the preferred embodiments of the present invention in which the first and second fluid channel means have been described as being integral with the inner core, the outer casing and the clamping rail, it is intended that this will preferably comprise injection molded channels integral with these elements, and similarly in connection with the connecting means for attachment to fluid conducting conduits, these elements will also be preferably injection molded integrally with the channel means in the inner core, outer casing, and/or clamping rail. Such a construction is particularly advantageous from the point of view of tightness or leak-proof characteristics.

BRIEF DESCRIPTION OF THE DRAWINGS

The present invention may be better understood with reference to the Figures, which are described as follows:

FIG. 5 is a front perspective view of an inner distribution rail of the diffusion device of the present invention;

FIG. 6 is a top cross-sectional view of the inner distribution rail of FIG. 5;

FIG. 7 is a front perspective view of an outer distribution rail of the diffusion device of the present invention;

FIG. 8 is a top cross-sectional view of the inner distribution rail of FIG. 7;

FIG. 9 is a front perspective view of an outer clamping rail of the diffusion device of the present invention;

FIG. 10 is a top perspective view of the outer clamping rail shown in FIG. 9;

FIG. 11 is a side cross-sectional view of the outer clamping rail shown in FIGS. 9 and 10;

FIG. 12 is a side cross-sectional view of a liquid distribution disc of the diffusion device of the present invention;

FIG. 13 is a top perspective view of the liquid distribution disc shown in FIG. 12; and FIG. 14 is an enlarged side cross-sectional view of a portion of the inner core of the diffusion device of the present invention including an opening for the channel means therein.

DETAILED DESCRIPTION

The present invention may be described in greater detail with reference to the Figures shown in the preferred embodiment of the present invention, in which like numerals refer to like portions thereof.

Figure 1:
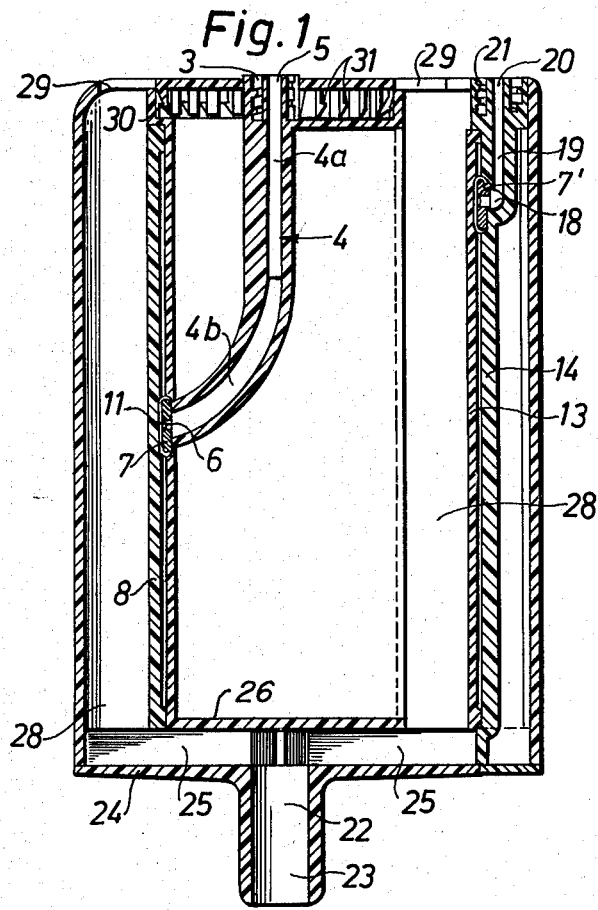
FIG. 1 is a longitudinal cross-sectional view of a diffusion device in accordance with the present invention.

Referring specifically to FIG. 1, a diffusion device in accordance with the present invention is shown. However, for the sake of clarity, the tubular, flexible, semi-permeable membrane and the spacing material have been left out. Guidance with respect to the shape or structure of these elements may thus be obtained from the prior art, such as the above-mentioned U.S. British and German patents. To those well-versed in this art, however, it will be clear that many other variations of these materials also exist.

Furthermore, while this particular embodiment is intended primarily for use in connection with dialysis, it will also be clear to those skilled in this art that devices of this type may be used for many other diffusion and/or filtration processes such as use as oxygenators where blood is introduced on one side of a membrane while oxygen or air is introduced on the other side thereof. Thus, the term "fluid" herein is intended to cover gases as well as liquids.

Referring again to the Figures, the diffusion device shown therein includes an outer casing 1 and an inner core 2. When used as a dialyzer, a flexible blood tube is connected to the device by connection to the connecting piece 3 from which extends a channel 4, which is itself composed of two tapered portions 4a and 4b. The channel 4 has an outer opening 5 and an inner opening 6. Preferably the inner opening faces parallel to the wall of the flattened tubular membrane which is compressed thereagainst so as to form a seal around the area around the opening. This is preferably accomplished by means of a distribution disc 7 which presses one wall of the flattened tubular membrane against the area around the inner opening 6. Distribution discs are shown in more detail in FIGS. 12 and 13.

The outer opening 5 of channel 4 is preferably arranged in the center of the side or transverse face of the inner core.

Figure 2:
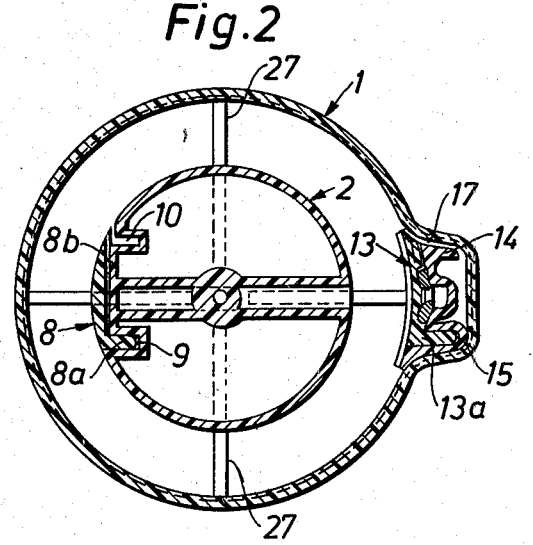
FIG. 2 is a transverse cross-sectional view of the diffusion device shown in FIG. 1.
Figure 3:
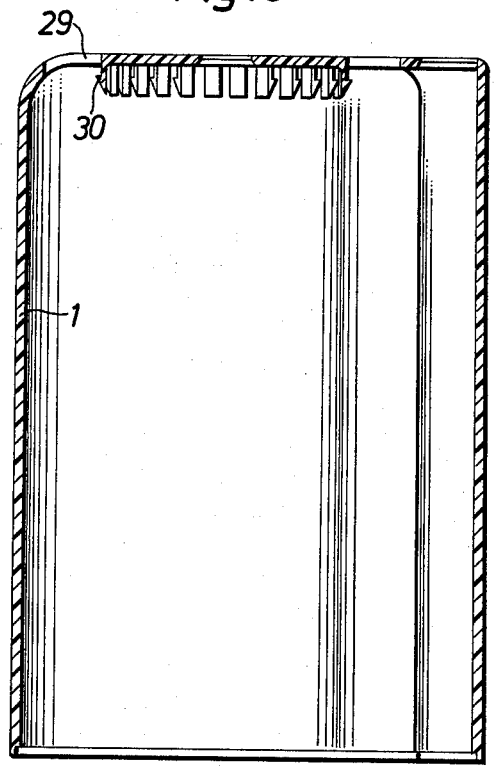
FIG. 3 is a longitudinal cross-sectional view of the outer casing of the diffusion device of the present invention.

An extremely tight or leak-proof construction is provided due to the fact that the outer opening 5 is molded integrally with a connecting piece 3, while the inner opening 6 is sealed by the aforementioned tubular flexible membrane being pressed against the outer area of the opening 6 by means of the distribution disc 7. Referring again to the distribution disc 7, it is covered by a distribution or pressure rail 8 shown in more detail in FIGS. 5 and 6. The distribution rail 8 is at least as long as the width of the flattened tubular membrane, and preferably has an angular shape, one leg of the angle being arranged to be pressed into a crevice together with the tubular membrane while the other leg of the angle is arranged so that it is pressed flat against the flattened tubular membrane. Referring again to FIG. 5 it can be seen that distribution rail 8 includes one leg of the angle 8a and another leg of the angle 8b, and that with the assistance of the leg 8a the inner end of the flexible tubular membrane is pressed tightly into a crevice or slit 9 in core 2. This angular rail can also be adapted so that it covers a second crevice arranged to tightly hold the inner end of the spacing material utilized in this device. This is specifically shown with respect to crevice or slit 10 as can best be seen in FIG. 2. On the surface of the distribution rail 8 facing the tubular membrane and the inner core is included a recess 11 for the distribution disc 7, as well as channels 12. When the tubular membrane is pressed down into channels 12 corresponding channels are formed inside the tubular membrane for conducting the blood into the space between the flatened side walls of the tubular membrane. In view of the spacing materials utilized channels are also thus formed between these side walls of the tubular membrane, as described in more detail in the aforementioned U.S., British and German patent specifications.

The blood is then conducted spirally to the outer open end of the tubular membrane which forms a seal by being pressed against the clamping rail 14 by the distribution rail 13 shown in more detail in FIGS. 7 and 8. The clamping rail 14 is shown in FIGS. 9 through 11 and will be discussed in more detail below. The forming of such a pressure seal takes place essentially in the same manner as discussed above in connection with the inner end of the tubular flexible membrane, i.e. the distribution rail 13 presses the flexible tubular membrane by means of a leg of the angle 13a into a crevice 15 in clamping rail 14. The spacing material utilized is introduced at the same time into a crevice or slit 17 between the clamping rail 14 and the casing 1 to receive the outer end of the spacing material. This insures that no sharp edges of the spacing material can cut into the tubular membrane either at its inner or outer ends.

At the outer end thereof, the blood is conducted from the tubular membrane with the assistance of a distribution disc 7' which is essentially identical to the distribution disc 7 discussed above. Distribution disc 7' thus presses one of the membrane walls against the areas around the inner aperture 18 of channel 19 provided in the clamping rail 14. Again this channel is integral with or injection molded with the clamping rail. The outer opening 20 of the same channel 19 is surrounded by a connecting piece 21 in the same manner as outer opening 5 of channel 4 is surrounded by connecting piece 3 discussed above. Channels 4 and 9 are thus similarly constructed in that regard.

Figure 4:
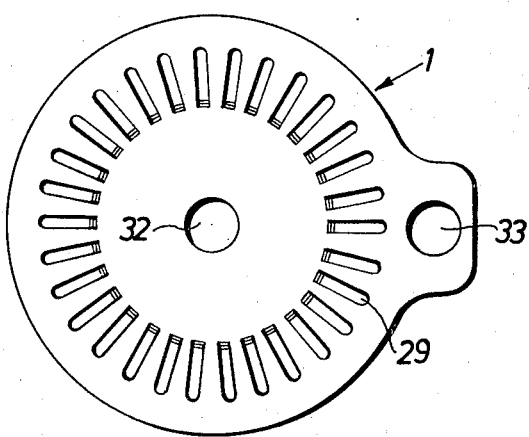
FIG. 4 is a perspective top view of the outer casing of the diffusion device of the present invention.

Referring again to FIG. 1, the second fluid or dialysis liquid is introduced through a channel 22 into pipe nozzle 23 which is integrally injection molded with the inner core 2. Pipe nozzle 23 is arranged centrally on lid-like end wall 24 closing the side face of outer casing 1. The dialysis liquid is then conducted through channels 25 formed between the end wall 24 and a second end wall 26 by means of spacer elements 27 provided between those end walls. The dialysis liquid is then passed through the annular space 28 between the outer casing 1 and the inner core 2, in which is maintained the spirally wound tubular membrane with the associated spacing material. The dialysis liquid is finally withdrawn at the upper end of the device through openings 29 as shown in FIG. 4.

In order to join together outer casing 1 and inner core 2 the outer casing is provided with hooks 30 adapted to engage underneath catch surfaces 31 arranged on inner core 2. These catch surfaces 31 can either be arranged on catch lips or may constitute a part of openings in the envelope of the core itself. Finally, the casing 1 is provided with a central opening 32 and an outer opening 33 intended to accommodate connecting pieces 3 and 21, respectively.

Referring to FIGS. 7 and 8, it can be seen that the distribution rail 13 is substantially similar to the distribution rail 8, again including a leg of angle 13a and a leg of angle 13b, and including a recess 34 in channel 35. The principal difference between the two distribution rails is that the recess 34 in distribution rail 13 is located near one end of the distribution rail. This is in order to keep channel 19 as short as possible.

Referring now to FIGS. 9 through 11, the clamping rail shown therein includes a crevice or groove 15 into which the leg of angle 13a of distribution rail 13 is intended to be clamped together with the outer open end of the tubular membrane. The clamping rail 14 also includes the aforementioned connecting piece 21 with associated channel 19 which at its outermost end terminates in opening 18 facing towards the distribution disc 7'. Clamping rail 14 is finished off at its bottom end by end wall 36 which, together with end wall 24, closes the lower opening of outer casing 1.

Referring to FIGS. 12 and 13, the construction of the distribution disc 7 and 7' which may be of identical shape is shown. In FIG. 14 opening 6 is shown in an enlarged view. Distribution disc 7 is intended to be pressed into opening 6 together with one wall of the tubular membrane. Inner opening 18 of channel 19 is essentially shaped in the same manner. Distribution disc 7 is provided with a central opening 37, and is intended to snap into opening 6 by means of projections 38 and their cooperation with corresponding projection 39. The degree of clamping pressure should be such that one wall of the tubular membrane is pressed against sealing ridge 40 provided around opening 6, and as a result thereof the blood can pass freely from the inner portion 4b of channel 4 through opening 6 and then through opening 37 of distribution disc 7 and its distribution channels 41 and finally into the space within the tubular membrane. After the blood has passed through the opening in the tubular membrane it can leave in a corresponding manner through distribution disc 7' which can thus serve as a collection disc, passing through opening 18 and channel 19.

The invention described herein is not to be limited exclusively to the embodiments shown above, but can be varied within the scope of the following claims. The shape of the individual parts as shown may differ within wide limits without exceeding the scope of this invention.

We claim:

1. Diffusion apparatus comprising an outer casing, a one-piece inner core disposed within said outer casing defining a diffusion space between said one-piece inner core and said outer casing, so that a tubular semi-permeable membrane having a first end and a second end and a spacing material can be wound about said one-piece inner core within said diffusion space, said one-piece inner core including a first end, a second end, and an aperture on the surface of said one-piece inner core facing said outer casing, said one-piece inner core further including integral inner core first fluid channel means communicating between said aperture on said surface of said one-piece inner core and said first end of said one-piece inner core whereby said one-piece inner core provides for fluid communication between said first end of said inner core and said aperture on said surface of said inner core for communication with a first fluid within the interior of said tubular semi-permeable membrane at the first end thereof, second fluid directing means communicating with a second fluid within said diffusion space for contacting the outer surface of said tubular semi-permeable membrane, and third fluid directing means communicating with said first fluid within the interior of said tubular semi-permeable membrane at the second end thereof.

2. The diffusion apparatus of claim 1 wherein said third fluid directing means comprises a one-piece clamping rail located in proximity to said outer casing, said one-piece clamping rail including a first end, a second end, and an aperture on the surface of said one-piece clamping rail facing said inner core, said one-piece clamping rail further including integral clamping rail fluid channel means providing for fluid communication between said first end of said one-piece clamping rail and said aperture on said surface of said clamping rail for communication with said first fluid within the interior of said tubular semi-permeable membrane at said second end thereof.

3. The diffusion apparatus of claim 2 wherein said end of said integral clamping rail first fluid channel means communicating with said aperture on said surface of said one-piece clamping rail includes connecting means for attachment to a fluid conducting conduit, said connecting means being integral with said end of said integral clamping rail first fluid channel means communicating with said aperture.

4. The diffusion apparatus of claim 2 including disc means cooperating with said end of said integral clamping rail first fluid channel means for sealing one face of said tubular semi-permeable membrane therebetween, whereby fluid may sealingly pass from said integral clamping rail first fluid channel means to the interior of said tubular semi-permeable membrane.

5. The diffusion apparatus of clam 4 wherein said disc means includes a plurality of disc channel means for directing said first fluid within said tubular semi-permeable membrane.

6. The diffusion apparatus of claim 4 including clamping rail pressure means forming a seal between the faces of said tubular semi-permeable membrane at said second end of said tubular semi-permeable membrane between said clamping rail pressure means and said one-piece clamping rail with said disc means therebetween, said clamping rail pressure means being at least as long as the width of said tubular semi-permeable membrane when flattened.

7. The diffusion apparatus of claim 6 wherein said one-piece clamping rail includes groove means, and said clamping rail pressure means includes an affixing portion adapted to cooperate with said clamping rail groove means to affix said clamping rail pressure means to said one-piece clamping rail with said tubular semi-permeable membrane therebetween.

8. The diffusion apparatus of claim 7 wherein said one-piece inner core includes spacing material groove means adapted to cooperate with said inner core pressure means so as to retain the end of said spacing material therein.

9. The diffusion apparatus of claim 6 wherein said clamping rail pressure means includes flow channel means on the face of said clamping rail pressure means facing said one-piece clamping rail, said flow channel means adapted to receive a portion of one face of said tubular semi-permeable membrane whereby channels for said first fluid are formed within said tubular semi-permeable membrane, said clamping rail pressure means further including a recessed portion on said face of said clamping rail pressure means facing said clamping rail, said recessed portion adapted to cooperate with the disc means.

10. The diffusion apparatus of claim 1 wherein said integral inner core first fluid channel means includes a first channel portion and a second channel portion, said first channel portion being substantially linear and said second channel portion being arcuate.

11. The diffusion apparatus of claim 1 wherein said end of said integral inner core first fluid channel means communicating with said first end of said one-piece inner core is located centrally at said first end of said one-piece inner core.

12. The diffusion apparatus of claim 1 wherein said end of said integral inner core first fluid channel means communicating with said aperture on said surface of said one-piece inner core includes connecting means for attachment to a fluid conducting conduit, said connecting means being integral with said end of said integral inner core first fluid channel means communicating with said aperture.

13. The diffusion apparatus of claim 1 including disc means cooperating with said end of said integral inner core first fluid channel means communicating with said aperture on said surface of said one-piece inner core for sealing one face of said tubular semi-permeable membrane therebetween, whereby fluid may sealingly pass from said integral inner core first fluid channel means to the interior of said tubular semi-permeable membrane.

14. The diffusion apparatus of claim 13 wherein said disc means includes a plurality of disc channel means for directing said first fluid within said tubular semi-permeable membrane.

15. The diffusion apparatus of claim 13 including inner core pressure means forming a seal between the faces of said tubular semi-permeable membrane at said first end of said tubular semi-permeable membrane between said inner core pressure means and said inner core, with said disc means therebetween, said inner core pressure means being at least as long as the width of said tubular semi-permeable membrane when flattened.

16. The diffusion apparatus of claim 15 wherein said inner core includes groove means and said inner core pressure means includes an affixing portion adapted to cooperate with said inner core groove means to affix said inner core pressure means to said inner core with said tubular semi-permeable membrane therebetween.

17. The diffusion apparatus of claim 15 wherein said inner core pressure means includes flow channel means on the face of said inner core pressure means facing said one-piece inner core, said flow channel means adapated to receive a portion of one face of said tubular semi-permeable membrane whereby channels for said first fluid are formed within said tubular semi-permeable membrane, said inner core pressure means further including a recessed portion on said face of said inner core pressure means facing said one-piece inner core adapated to cooperate with said disc means.

18. The diffusion apparatus of claim 17 including spacing material groove means associated with said one-piece clamping rail, said spacing material groove means adapted to cooperate with said one-piece clamping rail so as to retain the end of said spacing material therein.

19. The diffusion apparatus of claim 18 wherein said spacing material groove means comprises a channel between said one-piece clamping rail and said outer casing.

20. The diffusion apparatus of claim 1 including pressure means for forming a seal between the faces of said tubular semi-permeable membrane at said first and second ends thereof.

21. The diffusion apparatus of claim 20 wherein said pressure means includes an inner core pressure rail adapted to cooperate with said inner core.

22. The diffusion apparatus of claim 1 wherein said second fluid directing means is integral with said one-piece inner core.

23. The diffusion apparatus of claim 22 wherein said second fluid directing means includes an inlet nozzle and a plurality of spacer elements for directing said second fluid from said inlet nozzle to said diffusion space.

24. The diffusion apparatus of claim 23 wherein said inlet nozzle extends axially from said transverse end wall of said one-piece inner core.

25. Diffusion apparatus comprising an outer casing, an inner core disposed within said outer casing defining a diffusion space between said inner core and said outer casing, so that a tubular semi-permeable membrane having a first end and a second end and a spacing material can be wound about said inner core within said diffusion space, first fluid directing means communicating with a first fluid within the interior of said tubular semi-permeable membrane and located at said first end thereof, second fluid directing means communicating with a second fluid within said diffusion space for contacting the outer surface of said tubular semi-permeable membrane, and a one-piece clamping rail located in proximity to said outer casing, said one-piece clamping rail including a first end, a second end, and an aperture on the surface of said one-piece clamping rail facing said inner core, said one-piece clamping rail further including integral clamping rail first fluid channel means communicating between said aperture on said surface of said clamping rail and said first end of said one-piece clamping rail whereby said one-piece clamping rail provides for fluid communication between said first end of said clamping rail and said aperture on said surface of said clamping rail for communication with said first fluid within the interior of said tubular semi-permeable membrane at said second end thereof.

26. The diffusion apparatus of claim 25 wherein said inner core comprises a one-piece inner core and includes a first end, a second end, an aperture on the surface of said inner core facing said outer casing, and integral inner core first fluid channel means communicating between said aperture on said surface of said one-piece inner core and said first end of said one-piece inner core whereby said one-piece inner core provides for fluid communication between said first end of said one-piece inner core and said aperture on said surface of said one-piece inner core for communicating with said first fluid within the interior of said tubular semi-permeable membrane at the first end thereof.

* * * * *

UNITED STATES PATENT AND TRADEMARK OFFICE
CERTIFICATE OF CORRECTION

PATENT NO. : 4,231,875
DATED : November 4, 1980
INVENTOR(S) : Per-Olov A.V. Carlsson et al It is certified that error appears in the above-identified patent and that said Letters Patent are hereby corrected as shown below:

Column 8, line 44, after "said", insert --one-piece--.

Column 8, line 45, "the" should read --said--.

Signed and Sealed this

Seventh Day of April 1981

[SEAL]

Attest:

RENE D. TEGTMEYER

Attesting Officer    Acting Commissioner of Patents and Trademarks